3,298,807
PROCESS FOR PREPARING A POLISHING COMPOUND AND PRODUCT

Richard M. Mandle, Pompton Lakes, N.J., and William T. Straehle, Ellicott City, Md., assignors to W. R. Grace & Co., New York, N.Y., a corporation of Connecticut
No Drawing. Filed Dec. 17, 1964, Ser. No. 419,211
6 Claims. (Cl. 51—307)

This invention relates to an improved process for preparing a polishing compound adapted for use in polishing glass, ceramics, and other glass-like materials, and to the product of this process. In one specific embodiment it relates to the method for preparing a superior polishing compound from bastnasite.

In summary, the process of this invention comprises firing a concentrate of bastnasite which contains at least 65 weight percent rare earths expressed as oxides in an atmosphere containing hydrogen fluoride at a temperature of from above 1400° F. to less than the sintering temperature of the bastnasite.

In summary, the process of this invention also comprises firing a concentrate of bastnasite which contains at least 65 weight percent rare earths expressed as oxides in an atmosphere containing hydrogen fluoride at a temperature of from above 1000° F. to less than the sintering temperature of the bastnasite and thereafter milling the fired concentrate until 80 percent of the material has a particle size of less than 5 microns.

The composition of this invention is a product of the above-described processes.

There is a considerable need for polishing compounds, especially in the glass and ceramic industry. The present commercial polishing compositions are "red rouge," which is a mixture of finally divided iron oxide, and so called "white rouge," which is a quartz material. The principal objections to these materials are that the red rouge tends to color material being polished and also presents problems of damage to clothing of the workers because of the red color of the composition. To avoid the objection white rouge has been used in some areas. It has not been particularly successful as a substitute because of its rather low polishing efficiency.

In addition to the rouges, there are certain other commercially available materials such as cerium oxides which are used in the glass polishing industry. These materials are efficient but their commercial use on a large scale has been restricted because of the high cost of the materials.

Polishing compounds prepared from bastnasite were developed and are described in Patent No. 3,131,039 to Nonamaker. The process and product described in that patent involved a method of preparing a polishing compound comprising the steps of treating a concentrate of a bastnasite which contains at least 65% rare earth oxide by first wet milling until 80% of the material had a particle size of less than 5 microns followed by firing the wet concentrate in an atmosphere containing hydrogen fluoride at a temperature of from 1000° to 1400° F. for a period of from 1 to 4 hours and recovering the polishing material as a product.

I have found that a more efficient polishing compound can be prepared from bastnasite if commercial bastnasite concentrate is fired at temperatures within the range of from above 1400° F. up to less than the sintering temperature of the concentrate for a period of greater than 0.25 hour and preferably between 0.25 and 1.5 hours. I have also found that the grinding of the ore to obtain the fine particle size is unexpectedly more efficient if commercial bastnasite concentrate is fired at a temperature of from above 1000° F. up to less than the sintering temperature of the compound prior to milling step.

Bastnasite is a rare earth fluorocarbonate which contains slight traces of thorium. The mineral is found in the deposits in New Mexico and California. The crude ore mined in the California deposit contains about 10 percent rare earth oxides. In addition, the material contains magnesium oxide, calcium oxide, barium oxide, aluminum oxide, and iron oxide.

A concentrate of bastnasite is commercially available which has the following approximate composition after drying:

TABLE I

| Component: | Weight percent |
|---|---|
| Rare earth oxides | 68.0–75.0 |
| Fluorine | 5.0–6.0 |
| $SiO_2$ | 0.5–1.5 |
| $CO_2$ and combined $H_2O$ | 15.0–19.0 |

There are several possible methods of treating this concentrate to produce the improved polishing compound of this invention. Preferably, the first step of the process involves firing the concentrate. The bastnasite concentrate is fired at temperatures from about 1000° F. up to less than the sintering temperature of the concentrate in an atmosphere containing hydrogen fluoride. It has been found that firing of the concentrate prior to milling greatly increases the efficiency of the milling process in an unexpected manner. Although the milling step is improved after firing at temperatures up to 1400° F. before milling, the firing is preferably at temperatures of from above 1400° F. up to the sintering temperature of the concentrate. Firing at the higher temperatures has been found to unexpectedly increase the grinding efficiency and effective life of the grinding compound produced.

The superior grinding compound can also be produced by milling the bastnasite concentrate until 80 percent of the material has a particle size of less than 5 microns prior to the final firing step when the firing temperature is from above 1400° F. up to less than the sintering temperature of the concentrate. Preferably, the firing temperature should be above 1600° F.

The upper limit of the firing temperature is the sintering temperature of the concentrate. The sintering temperature of the bastnasite concentrate is determined by the following procedure. A portion of the material being tested is milled until at least 90 weight percent of the particles are less than 10 microns in size. Samples of the milled concentrate weighing 150 grams each are spread in silica dishes to a depth of 0.5 inch. Each sample is then calcined in a furnace for 80 minutes at a predetermined temperature, cooled in air, wet with water and wet screened by conventional techniques to determine the particle size distribution. In order to obtain particle size distributions over a range of calcination temperatures, samples are calcined at several selected temperatures.

The sintering temperature is defined as the maximum calcination temperature which can be employed in the above procedure to produce a material 50 weight percent of which is less than 3 millimeters in size. The sintering temperature of bastnasite concentrates varies with each lot to some extent. Sintering temperatures of 2100° F. have been determined with some lots.

In general the higher temperatures in the range less than the sintering temperature provide the optimum product.

In the processes of this invention, the concentrate is fired for a period of greater than 0.25 hour and preferably from 0.25 to 1.5 hours. The time required to calcine the concentrate is a function of the heating capabilities of the furnace employed. Hence, the heating time to produce the optimum product will vary with the characteristics of the furnace employed.

The bastnasite is fired in an atmosphere containing hydrogen fluoride in the processes of this invention. The hydrogen fluoride can be provided in the atmosphere by several techniques such as are disclosed in Patent No. 3,131,039. The concentrate can be treated with hydrofluoric acid or fluorosilicic acid in an amount equal to from 5 to 20 percent by weight of the rare earth oxide content of the ore. Alternately, the concentrate can be treated with an ammonium compound such as ammonium sulfate, ammonium nitrate, etc., or boric acid. Boric acid and the ammonium compound liberate boron trifluoride and hydrofluoric acid, respectively, which in turn react with the oxide resulting from the thermal decomposition of the carbonates. The proper atmosphere can also be achieved by adding hydrogen fluoride gas or steam to the furnace during the firing period, or by controlling the access of air to utilize the slow, natural evolution from the fluorine in the bastnasite.

In the preferred method, the fired material is then ground in a ball mill, fluid energy mill, or similar device. An acceptable method is to ball mill the material for a protracted period of time in the presence of water. This will effect a size reduction sufficient to produce a product having an average particle diameter as low as one micron.

The polishing compounds of this invention were evaluated by determining the abrasive power of each of the compounds and comparing the abrasive power with the same characteristics of commercial compounds. The abrasive power was determined using an American Optical automatic bowl feed polishing machine with accessories for polishing 2 inch diameter flat optical glass lens blanks. A minimum of 5 blanks was used for each test with each polishing material. The blanks were finish ground on one surface with a FFF grade silicon carbide and then were weighed on the analytical balance before polishing. Each lens was polished for 10 minutes on the machine using a slurry of 50 grams of solid polishing material with 100 cubic centimeters of water. The counterweight on the polishing machine was in a forward position for all tests. With the weight in this position, the pressure on the lens was 7.96 pounds per square inch. After polishing, each lens was again weighed and loss of weight determined. The average value of this loss in weight was reported as abrasive power of A.P.

The particle size of the polishing compound is very important. The particle should be in the 1 to 10 micron range. Good results are obtained when 80% of the material has a particle size of less than 5 microns, the balance having a particle size between 5 and 10 microns.

The invention is illustrated by the following illustrative but non-limiting examples.

*Example 1*

This example shows the advantages obtained by firing the bastnasite concentrate prior to the grinding step. The bastnasite concentrate employed in this example had the following analysis in wt. percent:

| | |
|---|---|
| Rare earth oxides | 74 |
| Fluorine | 5.1 |
| $SiO_2$ | 0.5 |
| $CO_2$ and combined $H_2O$ | 18.4 |

The samples were ground with an Abbe 2 in. x 15 in. Special Jar Rolling Mill. The specimen jar had a diameter of 5.25 in. and a height of 5.80 in., and the speed of rotation of the specimen jar was 75 r.p.m.

A 450 g. portion of unfired bastnasite ore was loaded together with 675 g. of flint pebbles and 454 g. water into a specimen jar. The bastnasite sample was milled for 48 hours, and the particle size distribution of the product was measured by the Andraesen Pipette technique. The resulting particle size distribution is shown in Table A.

A 454 g. sample of the above bastnasite concentrate which has been fired at a temperature of 1480° F. for about 0.5 hour was loaded into the specimen jar together with the 675 g. of flint pebbles and with 454 g. of water, and the fired ore was milled for 48 hours. The particles size distribution of the product was measured as described above, and the distribution found is shown in Table A.

TABLE A

| Size, Microns | Portion of sample below indicated size, wt. percent | |
|---|---|---|
| | Unfired, ground sample | Fired, ground sample |
| 10 | 90 | |
| 8 | 83 | |
| 5 | 50 | 92 |
| 3 | 36 | 70 |
| 2 | 26 | 53 |

*Example 2*

This example compares the grinding efficiency of the fired and unfired bastnasite concentrate employed in Example 1. The procedure of Example 1 was followed for both the fired and unfired ore concentrate except that the materials were milled for 72 hours before the particles size distribution was determined.

Particle size distributions of the fired and unfired materials after grinding for 72 hours are shown in Table B.

TABLE B

| Size, Microns | Portion of sample below indicated size, wt. percent | |
|---|---|---|
| | Unfired, ground sample | Fired, ground sample |
| 10 | 99.6 | |
| 8 | 95 | |
| 5 | 75 | 99 |
| 3 | 50 | 82 |
| 2 | 35 | 64 |
| 1 | 20 | 37 |

As can be seen from the results from Table A and Table B, the firing of the concentrate prior to grinding greatly increases the efficiency of the grinding step.

*Example 3*

This example illustrates the greatly improved effective life of the grinding compounds of this invention after sintering at temperatures approaching the sintering temperature.

In this example two samples of a bastnasite concentrate having a sintering temperature of about 2100° F. were prepared. One sample (Sample A) was fire at 1530° F. for 0.5 hour in a hydrogen fluoride atmosphere. The other sample (Sample B) was fired at 1800° F. for 0.5 hour in the same manner as Sample A.

A conventional wet grinding composition was prepared from each sample containing 8 g. of solid polishing compound with 100 cc. of water. Each sample was employed in an automatic bowl polishing machine with a pressure of 4.75 p.s.i. on the lens being ground. Samples of the grinding compounds were taken after polishing for 0, 3, and 11 hours.

Each sample was examined with an electron microscope. Sample A, which had been fired at the lower temperature, exhibited some reduction in particle size between the 0 and 3 hour samples. The 11 hour sample of Sample A exhibited a several fold size reduction in comparison with the 3 hour sample and contained a large quantity of fine fragments among the bastnasite particles. Severe wear of the Samples A grinding compound after 11 hours use was evident.

The 0 hour sample of Sample B exhibited particles having a larger, loosely agglomerated shape and a more irregular surface than the 0 hours samples of Sample A. The 3 hour sample of Sample B exhibited particles which were substantially the same size as the larger particles in Sample B after 3 hours use, the surface of which were more irregular. The great contrast was in the 11 hour samples. After 11 hours of use Sample B exhibited only a slight reduction in particle size and surface irregularity. The smaller bastnasite fragments were also much larger than those of the respective Sample A. Sample B evidenced a much greater useful life than Sample A from the electron microscope examination, establishing that higher firing temperatures provide grinding compounds having a greater useful life.

Obviously, many modifications and variations of the invention as hereinabove set forth, may be made without departing from the essence and scope thereof, and only such limitations should be applied as are indicated in the appended claims.

We claim:

1. The method of preparing a polishing material which comprises firing a concentrate of bastnasite which contains at least 65% rare earth oxides in an atmosphere containing hydrogen fluoride at a temperature of from about 1000° F. up to the sintering temperature of the concentrate for at least about 0.25 hour, and thereafter grinding the fired concentrate until 80% of the material has a particle size of less than 5 microns.

2. The process according to claim 1 wherein the concentrate is fired at a temperature of from about 1400° F. up to the sintering temperature of the concentrate.

3. The grinding compound produced by the method of claim 1 wherein the concentrate has been fired at a temperature of from about 1600° F. up to the sintering temperature of the concentrate.

4. The method of preparing a polishing material which comprises firing a concentrate of bastnasite which contains at least 65% rare earth oxides in an atmosphere containing hydrogen fluoride at a temperature of from about 1000° F. to 1400° F. for at least about 0.25 hour and thereafter grinding the fired concentrate until 80% of the material has a particle size of less than 5 microns.

5. The method of preparing a polishing material which comprises grinding a concentrate of bastnasite containing at least about 65% rare earth oxides until 80% of the material has a particle size of less than 5 microns and firing the concentrate in an atmosphere of hydrogen fluoride from about 1600° F. up to the sintering temperature of the concentrate for a period of at least about 0.25 hour.

6. The polishing compound produced by the method of claim 5.

References Cited by the Examiner

UNITED STATES PATENTS 3,131,039   4/1964   Nonamaker _____ 51—293

ALEXANDER H. BRODMERKEL, *Primary Examiner.*

D. J. ARNOLD, *Assistant Examiner.*